United States Patent
Hamada et al.

(10) Patent No.: US 9,491,642 B2
(45) Date of Patent: Nov. 8, 2016

(54) BASE STATION AND ANTENNA TILT ANGLE CONTROL METHOD

(71) Applicant: FUJITSU LIMITED, Kawasaki-shi, Kanagawa (JP)

(72) Inventors: Seiji Hamada, Kawasaki (JP); Kazuya Kobayashi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 254 days.

(21) Appl. No.: 14/050,856

(22) Filed: Oct. 10, 2013

(65) Prior Publication Data
US 2014/0135026 A1    May 15, 2014

(30) Foreign Application Priority Data

Nov. 12, 2012  (JP) .................................. 2012-248652

(51) Int. Cl.
*H04W 72/00* (2009.01)
*H04W 24/02* (2009.01)

(52) U.S. Cl.
CPC .................................. *H04W 24/02* (2013.01)

(58) Field of Classification Search
CPC ... H04W 24/02; H04W 16/28; H04W 16/18; H04W 24/08; H04W 72/087; G02B 26/0841; G02B 15/173; G02B 27/646; G02B 6/3518; G02B 6/3556; G02B 6/3584; G02B 15/14; G02B 17/08; G02B 1/11; G02B 26/0833; G02B 7/102; G02B 17/0615; G02B 17/0636; G02B 19/0028; G02B 19/0052; G02B 1/115
USPC ......... 455/562.1, 561, 67.3, 226.2; 342/359; 343/757, 882
See application file for complete search history.

(56) References Cited

U.S. PATENT DOCUMENTS

| | | | |
|---|---|---|---|
| 6,047,181 A | 4/2000 | Suonvieri | |
| 6,104,936 A * | 8/2000 | Kronestedt | 455/562.1 |
| 2004/0229651 A1 * | 11/2004 | Hulkkonen et al. | 455/562.1 |
| 2005/0250542 A1 * | 11/2005 | Aoyama et al. | 455/562.1 |
| 2008/0002646 A1 | 1/2008 | Hannu et al. | |

FOREIGN PATENT DOCUMENTS

| | | |
|---|---|---|
| JP | 09-501805 | 2/1997 |
| JP | 2004-343807 A | 12/2004 |
| JP | 2006-101442 | 4/2006 |

(Continued)

OTHER PUBLICATIONS

Notification of Reason for Refusal issued for corresponding Japanese Patent Application No. 2012-248652 mailed on May 10, 2016 with a partial English translation.

*Primary Examiner* — Marsha D Banks Harold
*Assistant Examiner* — Natasha W Cosme
(74) *Attorney, Agent, or Firm* — Myers Wolin, LLC

(57) ABSTRACT

A base station includes an antenna, a sending unit, a monitoring unit, and a controlling unit. The antenna is configured to be operated corresponding to a communication area of the base station, the antenna being capable of controlling a tilt angle, the tilt angle being an angle made by a vertical direction and a direction of a main beam of the antenna. The sending unit is configured to send a command corresponding to adjustment of timing of sending a signal sent from a mobile station. The monitoring unit is configured to monitor the number of mobile stations present in the communication area by using the command. The controlling unit is configured to reduce the tilt angle when the number of mobile stations exceeds an upper limit allowed to be contained in the communication area.

5 Claims, 10 Drawing Sheets

(56) References Cited

FOREIGN PATENT DOCUMENTS

| JP | 2009-543436 A | 12/2009 |
| JP | 2010-283440 | 12/2010 |
| JP | 2012-054736 A | 3/2012 |
| JP | 2012-100249 A | 5/2012 |
| WO | 2012/083450 A1 | 6/2012 |

* cited by examiner

| TA COMMAND: T_A | BASE STATION-MOBILE STATION DISTANCE | NUMBER OF MOBILE STATIONS |
|---|---|---|
| 0 | 0 | 0 |
| 1 | 78 | 10 |
| 2 | 156 | 2 |
| 3 | 234 | 9 |
| 4 | 312 | 4 |
| 5 | 390 | 5 |
| 47 | 3669 | 2 |
| 48 | 3747 | 6 |
| 49 | 3825 | 9 |
| 50 | 3904 | 0 |

FIG. 9

| SECTOR LENGTH: L [m] | TILT ANGLE: θ [°] |
|---|---|
| 0 | 0 |
| 78 | 21.32342443 |
| 156 | 37.97949751 |
| 234 | 49.50518852 |
| 3669 | 86.88013527 |
| 3747 | 86.94500802 |
| 3825 | 87.00724028 |
| 3904 | 87.0669899 |

BASE STATION AND ANTENNA TILT ANGLE CONTROL METHOD

CROSS-REFERENCE TO RELATED APPLICATION

This application is based upon and claims the benefit of priority of the prior Japanese Patent Application No. 2012-248652, filed on Nov. 12, 2012, the entire contents of which are incorporated herein by reference.

FIELD

The embodiments discussed herein are related to a base station and an antenna tilt angle control method.

BACKGROUND

In a mobile communication system, in general, a size of a communication area formed by one base station is often decided to a fixed size considering conditions, such as communication environments in the establishment location, population in the establishment location, and a number of base stations present in the vicinity of the base station to be established, when establishing the base station.

Examples of related arts are Japanese Laid-open Patent Publication Nos. 2006-101442 and 2010-283440.

SUMMARY

According to an aspect of the invention, a base station includes an antenna configured to be operated corresponding to a communication area of the base station, the antenna being capable of controlling a tilt angle, the tilt angle being an angle between a vertical direction and a direction of a main beam of the antenna; a sending unit configured to send a command corresponding to adjustment of timing of sending a signal sent from a mobile station; a monitoring unit configured to monitor the number of mobile stations present in the communication area by using the command; and a controlling unit configured to reduce the tilt angle when the number of mobile stations exceeds an upper limit allowed to be contained in the communication area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a chart illustrating one example of a tilt angle table of the first embodiment;

DESCRIPTION OF EMBODIMENTS

Preliminary Considerations

Figure 1:
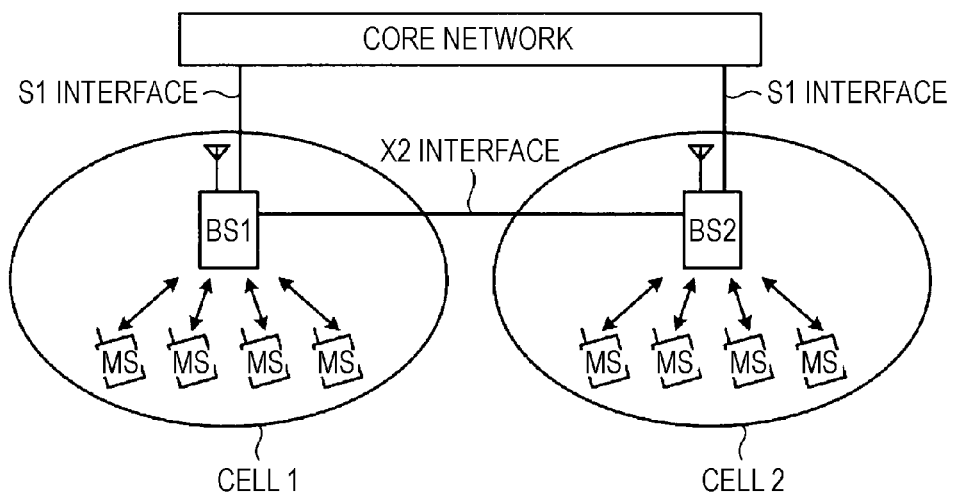
FIG. 1 is a diagram illustrating one example of a communication system of a first embodiment.

When a temporary event, such as an accident, occurs in a communication area served by a base station, a situation sometimes occurs in which mobile stations in a number temporarily greatly exceeding an assumption at the time of establishing the base station are present in the communication area. As such a situation occurs, it is assumed in the base station that mobile stations having exceeded the assumption at the time of establishing the base station become not possible to be contained in the communication area. With that, in preparation for occurrence of such a situation, it is considered to establish in advance a base station having a communication area that is capable of containing mobile stations more than the number being contained in a normal period. However, the more the number of mobile stations being contained becomes, the greater the throughput to manage each mobile station, the throughput for communication, and the like in the base station. Therefore, a base station having a greater upper limit on the number of mobile stations allowed to be contained in the communication area of the local station (may be called below as "a containable upper limit") ends up with having to be provided with higher processing capacity in advance. That is, a base station that is capable of absorbing a temporary increase in the mobile stations due to occurrence of a temporary event ends up with being an over engineered base station in a normal period. Thus, it is desirable that a containable upper limit when establishing a base station is set with reference to a number of mobile stations in a normal period in the establishment location. However, when a containable upper limit is set with reference to the number of mobile stations in a normal period, the base station sometimes becomes not possible to contain all mobile stations in the communication area as described above.

In contrast, there is also a case that the number of currently contained mobile stations is less than the containable upper limit in base stations in the vicinity of the base station that has become not possible to contain all mobile stations. That is, among base stations, there are sometimes variations in the number of mobile stations present in a communication area of each other. Presence of such variation decreases the processing efficiency in the entire communication system. Thus, it is desirable for the entire communication system that mobile stations to be contained in the communication area of each base station are adapted among the base stations, thereby removing such variation to be able to contain all mobile stations present in the communication areas.

It is desirable to equalize numbers of mobile stations being contained among a plurality of base stations accordingly.

Detailed descriptions are given below to a base station and an antenna tilt angle control method disclosed herein based on the drawings. The base station and the antenna tilt angle control method disclosed herein are not limited by the following embodiments. In each embodiment, an identical reference character is assigned to configurations having an identical function and steps carrying out identical process, and repetitive descriptions are omitted.

First Embodiment

Configuration of Communication System

FIG. 1 is a diagram illustrating one example of a communication system of a first embodiment. FIG. 1 illustrates a communication system in a long term evolution (LTE) system as one example. As illustrated in FIG. 1, a base station BS1 forms a cell 1, which is a communication area of the local station, and is capable of communication with a plurality of mobile stations MS present in the cell 1. Similarly, a base station BS2 forms a cell 2, which is a communication area of the local station, and is capable of communication with a plurality of mobile stations MS present in the cell 2. The base stations BS1 and BS2 are directly connected by an X2 interface which is a wired transmission path. Each base station and a core network are connected by an S1 interface which is a wired transmission path. Therefore, the base stations BS1 and BS2 are connected via the S1 interface and the core network.

<Cell Configuration>

Figure 2:
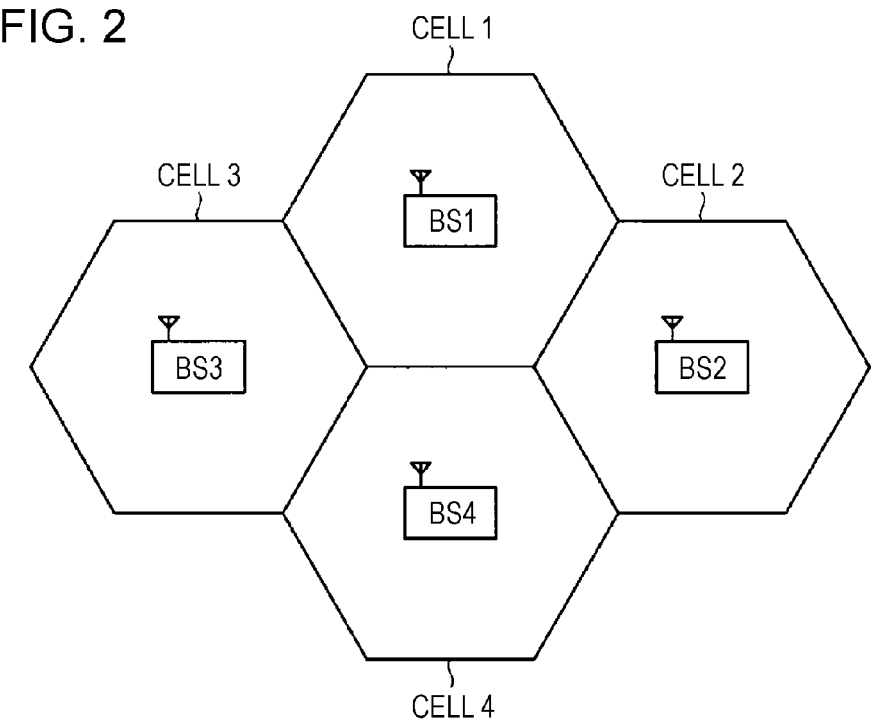
FIG. 2 is a diagram illustrating one example of a cell configuration of the first embodiment.

FIG. 2 is a diagram illustrating one example of a cell configuration of the first embodiment. As illustrated in FIG. 2, respective base stations BS1 through BS4 form cells 1 through 4 which are respective communication areas. Since the base stations BS1 through BS4 are established adjacent to each other, cell edges each other make contact or communication areas of each other overlap at the cell edges. FIG. 2 illustrates a case that the cell edges make contact with each other. In the descriptions below, a distance from a certain base station to a cell edge of the cell formed by the base station is called as "a cell radius".

<Sector Configuration>

Figure 3:
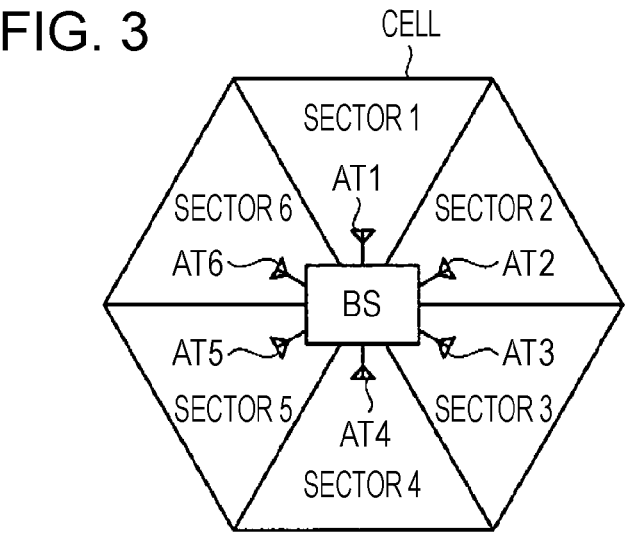
FIG. 3 is a diagram illustrating one example of a sector configuration of the first embodiment.

FIG. 3 is a diagram illustrating one example of a sector configuration of the first embodiment. As a technique to increase a number of mobile stations contained per base station, there is a technique that one base station is provided with a plurality of directional antennas and one cell is divided into a plurality of communication areas corresponding to the plurality of directional antennas respectively. Each of the divided communication areas is called as "sector". FIG. 3 illustrates a case that a base stations BS is provided with six directional antennas AT1 through AT6 and one cell is divided into six sectors, as one example. That is, the base station BS forms sectors 1 through 6 using the antennas AT1 through AT6.

<Communication Area Control>

Figure 4:
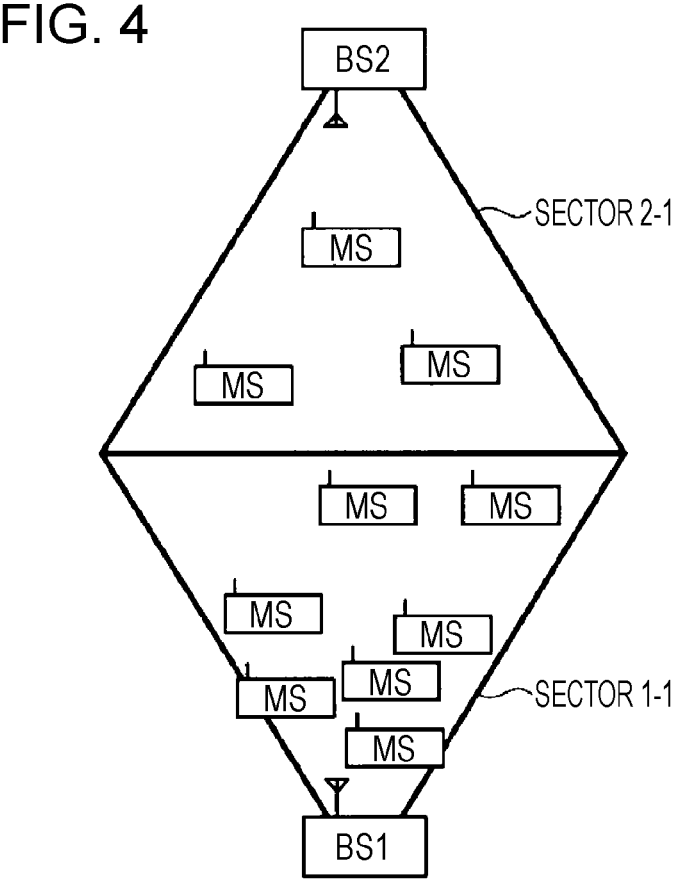
FIG. 4 is a diagram served for description of communication area control of the first embodiment.
Figure 5:
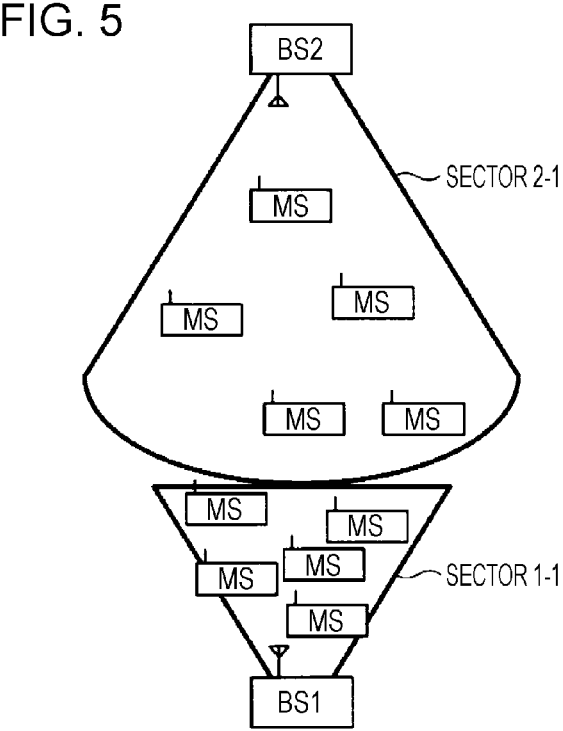
FIG. 5 is another diagram served for description of the communication area control of the first embodiment.

FIGS. 4 and 5 are diagrams served for description of communication area control of the first embodiment. FIGS. 4 and 5 illustrate a case that two base stations of the base stations BS1 and BS2 are adjacent and also sector edges of each other make contact. In the descriptions below, a distance from a certain base station to a sector edge formed by the base station is called as "a sector length".

As illustrated in FIG. 4, in a sector 1-1 formed by the base station BS1, there are seven mobile stations MS. In the meanwhile, in a sector 2-1 formed by the base station BS2, there are three mobile stations MS. That is to say, among base stations, there are variations in the number of mobile stations present in the sector of each other. Here, when the containable upper limit on each base station per sector is defined as "5", the number of mobile stations that the base station BS1 is not capable of containing becomes "2" while the base station BS2 is still capable of containing two mobile stations. With that, as illustrated in FIG. 5, the base station BS1 diminishes the sector 1-1 until the number of mobile stations MS present in the sector 1-1 becomes "5". This enables the base station BS1 to have not more than a containable upper limit of mobile stations present in the sector 1-1. In addition, the base station BS2 enlarges the sector 2-1 until a sector edge of the sector 2-1 makes contact with a sector edge of the sector 1-1 in order to accept the two mobile stations MS that turn out to be present outside the sector 1-1. This makes the respective numbers of mobile stations present in the sectors 1-1 and 2-1 become "5", which is not more than the containable upper limit, and also enables to equalize the numbers of mobile stations being contained among the base stations BS1 and BS2. The diminishment and enlargement of a sector are carried out by controlling a tilt angle of an antenna as described below. Details of tilt angle control are described later.

<Configuration of Base Stations>

Figure 6:
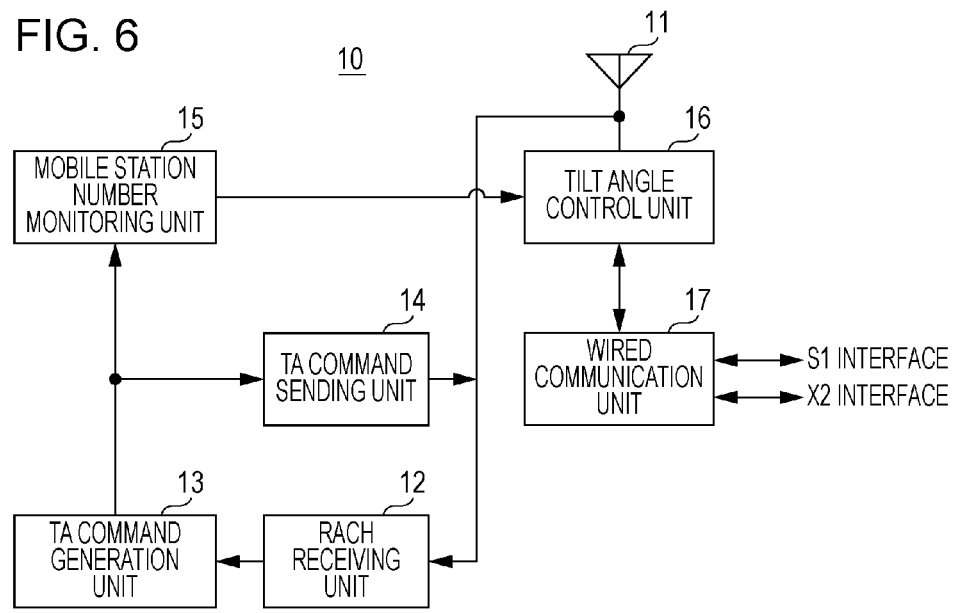
FIG. 6 is a functional block diagram illustrating one example of a base station of the first embodiment.

FIG. 6 is a functional block diagram illustrating one example of a base station of the first embodiment. In a case that one cell is divided into a plurality of sectors, one base station has the configuration illustrated in FIG. 6 in the number of sectors. For example, a base station that forms six sectors as illustrated in FIG. 3 is provided with six configurations illustrated in FIG. 6. Since process in the plurality of sectors is identical, in the descriptions below on the first embodiment, descriptions are given for one sector.

In FIG. 6, a base station 10 includes an antenna 11, a random access channel (RACH) receiving unit 12, a timing advance (TA) command generation unit 13, a TA command sending unit 14, a mobile station number monitoring unit 15, a tilt angle control unit 16, and a wired communication unit 17.

The RACH receiving unit 12 receives, via the antenna 11, a random access signal that is sent from a mobile station present in a sector of the local station and outputs the random access signal thus received to the TA command generation unit 13. A random access signal is sent from a plurality of mobile stations that seeks to be contained in the local station. That is, a random access signal is used at the time of an initial access between a mobile station that has moved into a sector formed by the local station and the local station. Since a random access signal contains an identifier that is unique to each mobile station (may be called below as "a mobile station identifier"), a random access signal may be associated with a mobile station in a manner of one-to-one. Thus, in the base station 10, it is possible to recognize the number of mobile stations present in the sector of the local station using a random access signal. A random access signal may also be called as "a RACH preamble".

The TA command generation unit 13 generates a TA command using a random access signal and outputs the TA command thus generated to the TA command sending unit 14 and the mobile station number monitoring unit 15. Here, a TA command is used for adjustment of timing to send a signal sent from each mobile station in such a manner that respective receiving timing of signals that are sent from a plurality of mobile stations coincides with each other at the base station 10. Thus, depending on the distance between the base station and the mobile station (may be called below as "a base station-mobile station distance"), the magnitude of TA command value varies. That is, in order to have receiving timing at the base station coincided with each other, a mobile station having a longer distance from the base station has to start sending earlier, so that the TA command value becomes greater. Thus, the magnitude of TA command value becomes an indicator for the magnitude of base station-mobile station distance. The mobile station starts sending data at timing earlier from reference timing for the time corresponding to the TA command. The TA command also contains a mobile station identifier to identify a mobile station at its destination. That is, a TA command generated by the TA command generation unit 13 contains what is identical to the mobile station identifier contained in the random access signal used for generation of the TA command. The TA command is also used in communication systems in the past for adjustment of timing of sending from a mobile station.

For example, in the LTE system, as a random access signal, a Zadoff-Chu sequence is used. Among a plurality of sequences generated by cyclic shifting a Zadoff-Chu sequence, there are characteristics that cross-correlation becomes small. Therefore, it is possible to generate a plurality of random access signals from one Zadoff-Chu sequence. The TA command generation unit 13 carries out correlation operation between the random access signal that is sent from each mobile station and the Zadoff-Chu sequence to obtain a delay time from the reference timing to the correlation peak. Then, the TA command generation unit 13 generates a TA command corresponding to the delay time. For example, in the LTE system, 1283 TA commands having a TA command value of "$T_A$=0, 1, 2, . . . , 1282" are used and 1 $T_A$ is defined as 0.52 μs. That is to say, the 1283 TA commands may discretely express the time from 0 to 666.64 μs.

The TA command sending unit 14 sends TA commands to mobile stations present in the sector of the local station via the antenna 11.

The mobile station number monitoring unit 15 monitors the number of mobile stations present in the sector of the local station using the TA commands and outputs the monitoring result to the tilt angle control unit 16. Details of process in the mobile station number monitoring unit 15 are described later.

The tilt angle control unit 16 controls the tilt angle of the antenna 11 based on the monitoring result in the mobile station number monitoring unit 15, that is, the number of mobile stations present in the sector of the local station. The tilt angle control unit 16 also outputs, to the wired communication unit 17, a message (may be called below as "a request message") to request another base station adjacent to the local station (another base station may be called below as "an adjacent base station") to accept the mobile stations that turn out to be present outside the sector of the local station with diminishing the sector of the local station. The tilt angle control unit 16 also generates a response message representing response contents to the request message from the adjacent base station and outputs the response message thus generated to the wired communication unit 17. Details of process in the tilt angle control unit 16 are described later.

The wired communication unit 17 is connected to the S1 interface and the X2 interface and sends a request message inputted from the tilt angle control unit 16 to an adjacent base station via the S1 interface or the X2 interface. The wired communication unit 17 also receives a response message representing the response contents to the request message from the local station via the S1 interface or the X2 interface and outputs the response message thus received to the tilt angle control unit 16. The wired communication unit 17 also receives a request message of an adjacent base station via the S1 interface or the X2 interface from the adjacent base station and outputs the request message thus received to the tilt angle control unit 16.

<Process in Mobile Station Number Monitoring Unit and Tilt Angle Control Unit>

Here, as illustrated in FIGS. 4 and 5, descriptions are given as one example to process in a case that the two base stations BS1 and BS2 adjacent to each other have their sector edges making contact with each other.

As described above, the magnitude of TA command value becomes an indicator for the magnitude of base station-mobile station distance. Specifically, a base station-mobile station distance may be obtained by the following expression (1).

$$\text{Base station–mobile station distance [m]=Speed of light [m/s]} \times (\text{Time corresponding to TA command value [s]}/2) \qquad (1)$$

For example, in the LTE system, 1 $T_A$ is defined as 0.52 μs, so that $T_A$=1 is equivalent to 78 m, $T_A$=2 to 156 m, $T_A$=3 to 234 m, . . . , and $T_A$=50 to 2904 m. That is to say, for every increase in TA command value by "1", the base station-mobile station distance increases by 78 m stepwise.

Figures 7, 8:
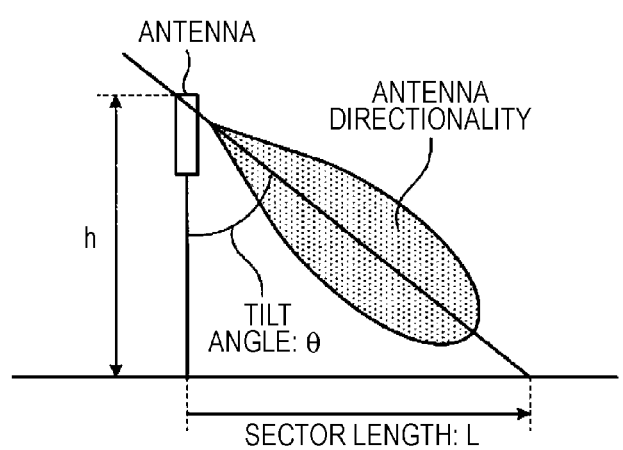
FIG. 7 is a chart illustrating one example of a mobile station number table of the first embodiment.
FIG. 8 is a chart served for description of a tilt angle of the first embodiment.

With that, the mobile station number monitoring unit 15 monitors the number of mobile stations present in the sector of the local station using the TA commands inputted from the TA command generation unit 13. Specifically, the mobile station number monitoring unit 15 calculates the TA commands inputted from the TA command generation unit 13 and creates a mobile station number table illustrated in FIG. 7. FIG. 7 is a chart illustrating one example of a mobile station number table of the first embodiment. In the mobile station number table, a TA command value $T_A$, a base station-mobile station distance, and a number of mobile stations are associated with each other. The mobile station number monitoring unit 15 obtains the TA command values and the mobile station identifiers from the TA commands thus inputted and accumulates the number of mobile stations for each base station-mobile station distance. From this accumulation, the mobile station number monitoring unit 15 monitors the number of mobile stations in the sector of the local station. A plurality of TA commands with different mobile station identifiers are sent to different mobile stations, and a plurality of TA commands with an identical mobile station identifier are sent to an identical mobile station. Therefore, the mobile station number monitoring unit 15 is capable of recognizing the number of mobile stations by obtaining the mobile station identifiers contained in the TA commands. The mobile station number monitoring unit 15 is also capable of recognizing a distance from the local station to the mobile station at the destination of the TA command, that is, a base station-mobile station distance by obtaining the TA command value. In the specific example of FIG. 7, a number of mobile stations=0 is accumulated in $T_A$=0 (0 m), a number of mobile stations=10 in $T_A$=1 (78 m), a number of mobile stations=2 in $T_A$=2 (156 m), a number of mobile stations=9 in $T_A$=3 (234 m), a number of mobile stations=4 in $T_A$=4 (312 m), and a number of mobile stations=5 in $T_A$=5 (390 m), respectively. That is to say, in the specific example of FIG. 7, it is represented that the number of mobile stations present in a range of around 390 m from the position of establishing the base station 10 is "30". The mobile station number monitoring unit 15 outputs the number of mobile stations accumulated for each base station-mobile station distance at a plurality of stages as the monitoring result to the tilt angle control unit 16.

The tilt angle control unit 16 controls the tilt angle of the antenna 11 based on the monitoring result that is inputted from the mobile station number monitoring unit 15. Here, in a directional antenna, relationship between a tilt angle θ, a height h, of the antenna, and a sector length L, is as illustrated in FIG. 8. FIG. 8 is a chart served for description of a tilt angle of the first embodiment. The tilt angle θ is obtained by the following expression (2). That is to say, "a tilt angle" in the disclosure herein is defined as "an angle made by a vertical direction and a direction of a main beam of the antenna". Thus, "control of a tilt angle" in the disclosure herein is equivalent to "perpendicular directional control of antenna".

$$\text{Tilt angle } \theta = \tan^{-1}(L/h) \quad (2)$$

Thus, as the tilt angle increases, the sector length increases to enlarge the sector. That is to say, a tilt angle defines the size of sector. The tilt angle control unit 16 knows the height of the antenna 11 in advance. With that, the tilt angle control unit 16 has a tilt angle table obtained in accordance with the above expression (2). FIG. 9 is a chart illustrating one example of a tilt angle table of the first embodiment. In the tilt angle table, a sector length L, and a tilt angle θ, are associated with each other. In addition, in the tilt angle control unit 16, a containable upper limit Uth per sector is set.

FIGS. 7 and 9 illustrate a case that the maximum value of sector length is approximately 3900 m as one example. That is to say, a total value of the numbers of mobile stations accumulated for each distance in FIG. 7 becomes the number of mobile stations currently present in the sector of the local station.

Hereinafter, process in the tilt angle control unit 16 is described separate into a case that the base station 10 is equivalent to the base station BS1 illustrated in FIGS. 4 and 5 and a case that the base station 10 is equivalent to the base station BS2 illustrated in FIGS. 4 and 5. The base station BS1 is a base station that diminishes a sector of the local station, and the base station BS2 is a base station that enlarges a sector of the local station with diminishing the sector of the base station BS1. FIG. 6 illustrates each configuration of the base stations BS1 and BS2. Descriptions are given below as one example to process in a case that the two base stations BS1 and BS2 adjacent to each other having their sector edges making contact with each other.

<Case that Base Station 10 is Equivalent to Base Station BS1>

When the number of mobile stations that are present in the sector of the local station exceeds Uth, the tilt angle control unit 16 obtains a sector length Lth so as that the number present of the mobile stations present in the sector is Uth or less. Thus, Lth is equivalent to the sector length of the base station BS1 that is planned to be changed. For example, in a case of "Uth=20", in the specific example illustrated in FIG. 7, the number of mobile stations present in the sector exceeds the containable upper limit. In addition, since "Uth=20", Lth becomes "156 m". In order not to perform tilt angle control frequently, "Uth×α (α<1, for example, α=0.9)" may be set in the tilt angle control unit 16.

The tilt angle control unit 16 also obtains the number of mobile stations that turn out to be present outside the sector of the local station with reduction of the tilt angle, that is, the number of mobile stations expected for acceptance in the adjacent base station, U_confer. U_confer is obtained by subtracting the number of mobile stations present in the range of Lth from the number of mobile stations currently present in the sector of the local station.

The tilt angle control unit 16 outputs a request message containing Lth and U_confer thus obtained to the wired communication unit 17. This request message is sent to the base station BS2 adjacent to the base station BS1 by the wired communication unit 17.

Then, a response message to the request message is sent by the base station BS2 and received by the wired communication unit 17 in the base station BS1. Then, the response message is inputted to the tilt angle control unit 16. The adjacent base station BS2 that has received the request message sends a response message of "OK" in a case that the mobile stations in the number represented in U_confer contained in the request message is acceptable and a response message of "NG" in a case of not acceptable.

In a case that the response message is "OK", the tilt angle control unit 16 refers to the tilt angle table and reduces the tilt angle of the antenna 11 to the angle corresponding to Lth. In contrast, in a case that the response message is "NG", the tilt angle control unit 16 does not change the tilt angle of the antenna 11.

<In Case that the Base Station 10 is Equivalent to Base Station BS2>

The request message sent from the base station BS1 adjacent to the base station BS2, is received by the wired communication unit 17 and inputted to the tilt angle control unit 16 in the base station BS2. In description below for this case, each unit will be one included in the base station BS2.

The tilt angle control unit 16 obtains Lth and U_confer contained in the request message. The tilt angle control unit 16 confirms the number of mobile stations currently present in the sector of the local station from the monitoring result that is inputted from the mobile station number monitoring unit 15 and obtains a total value of the number of mobile stations currently present in the sector of the local station and U_confer. The tilt angle control unit 16 determines whether or not the number of mobile stations represented in U_confer is acceptable by the local station by comparing the total value thus obtained with Uth. In order to secure a margin for the variations in the number of mobile stations, the tilt angle control unit 16 may obtain the total value as U_confer×β (β>1, for example, β=1.2).

In a case that the total value thus obtained is Uth or less, the tilt angle control unit 16 determines that the number of mobile stations represented in U_confer is acceptable, generates a response message of "OK", and outputs the response message thus generated to the wired communication unit 17. In this case, the tilt angle control unit 16 obtains an increment L_confer of the sector length of the local station by the following expression (3) from Lth, the current sector length X of the local station, and the distance W between the local station and the base station BS1. Then, the tilt angle control unit 16 increases the tilt angle of the antenna 11 up to the angle corresponding to "X+L_confer" referring to the tilt angle table.

$$L\_confer = W - Lth - X \quad (3)$$

In contrast, in a case that the total value thus obtained exceeds Uth, the tilt angle control unit 16 determines that the number of mobile stations represented in U_confer is not acceptable, generates a response message of "NG", and outputs the response message thus generated to the wired communication unit 17. In this case, the tilt angle control unit 16 does not change the tilt angle of the antenna 11.

In the above descriptions, a case that the two base stations BS1 and BS2 have their sector edges making contact with each other has been described as one example. However, there is also a case that the two base stations BS1 and BS2 have their sectors overlapping with each other. In a case that their sectors overlap with each other, there is a case that the base station BS2 requested for acceptance of the mobile stations may not enlarge the sector of the local station upon accepting the mobile stations. The case that the base station BS2 may not enlarge the sector of the local station is a case, even when the sector length of the base station BS1 is reduced to Lth, that their sectors still overlap with each other or their sector edges make contact with each other. In this case, in the above expression (3), "L_confer≤0". With that, in a case that the total value of the number of mobile stations currently present in the sector of the local station and U_confer becomes Uth or less and also L_confer≤0, the tilt angle control unit 16 of the base station BS2 generates a response message of "OK" while not changing the tilt angle of the antenna 11.

<Process in Base Station>

Figure 10:
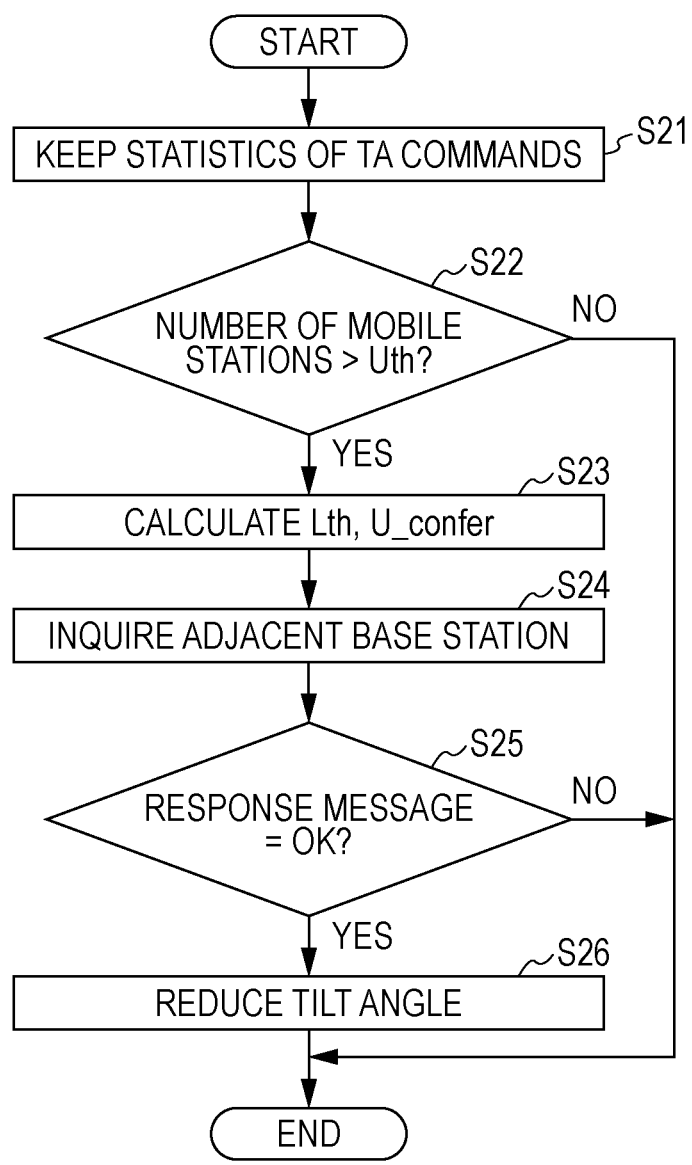
FIG. 10 is a flowchart served for description of process in the base station of the first embodiment.

FIG. 10 is a flowchart served for description of process in the base station of the first embodiment. The base station 10 carries out process in steps S21 through S26 every time a new TA command is sent.

The mobile station number monitoring unit 15 accumulates TA commands inputted from the TA command generation unit 13 and creates a mobile station number table, thereby keeping statistics of TA commands (step S21).

The tilt angle control unit 16 determines whether or not the number of mobile stations present in the sector of the local station exceeds the containable upper limit Uth (step S22).

When the number of mobile stations present in the sector of the local station exceeds Uth (Yes in step S22), the tilt angle control unit 16 calculates the sector length Lth, for the Uth or less of mobile stations present in the sector and the number U_confer, of mobile stations expected for acceptance in an adjacent base station (step S23).

The tilt angle control unit 16 sends a request message containing Lth and U_confer to the adjacent base station, thereby inquiring of the adjacent base station whether or not the number of mobile stations represented in U_confer is acceptable for the adjacent base station (step S24).

When the response message that is sent from the adjacent base station to the request message is "OK" (Yes in step S25), the tilt angle control unit 16 reduces the tilt angle of the antenna 11 (step S26).

In contrast, when the number of mobile stations present in the sector of the local station does not exceed Uth (No in step S22) or when the response message is "NG" (No in step S25), the tilt angle control unit 16 does not change the tilt angle of the antenna 11.

<Process in Communication System>

Figure 11:
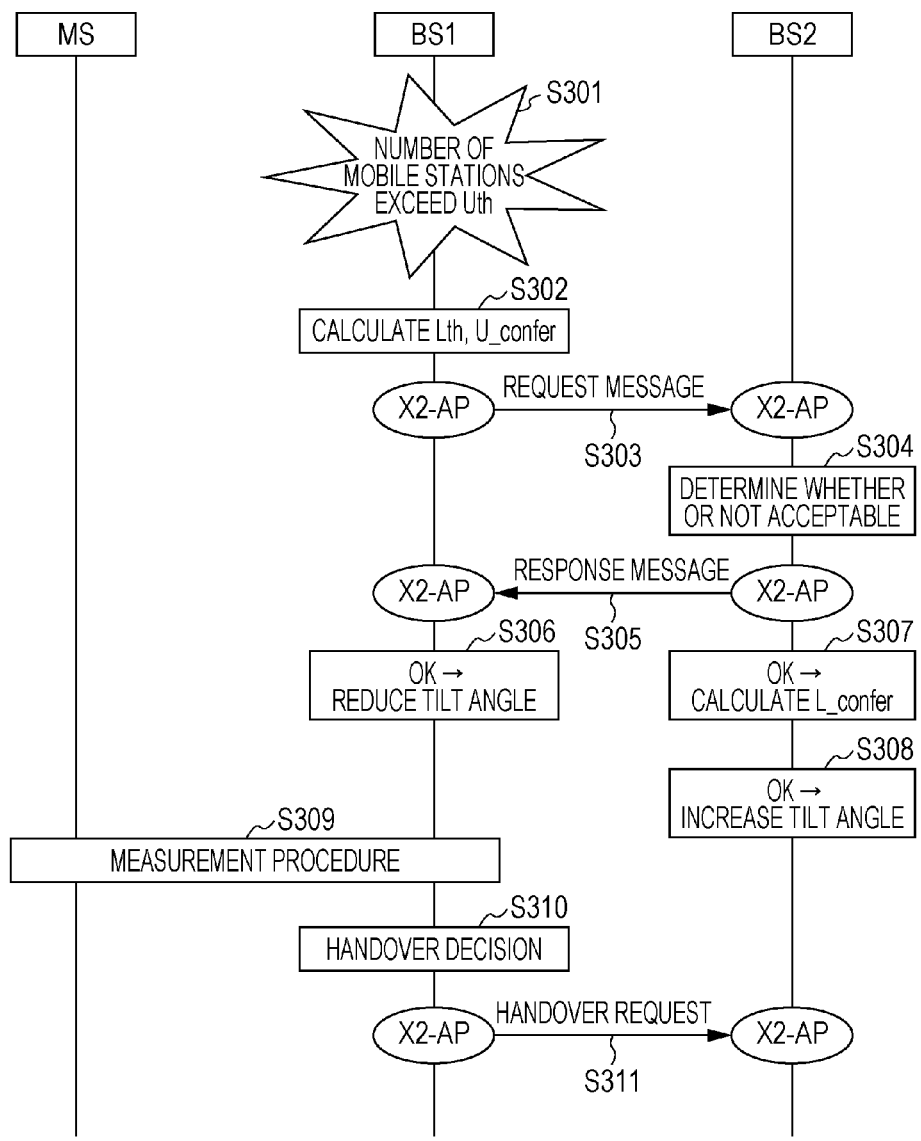
FIG. 11 is a sequence diagram served for description of process in the communication system of the first embodiment.

FIG. 11 is a sequence diagram served for description of process in the communication system of the first embodiment. Here, descriptions are given as one example to a case of exchanging messages among base stations using the X2 interface.

As determining that the number of mobile stations present in the sector of the local station exceeds Uth (step S301), the base station BS1 calculates Lth and U_confer (step S302). The base station BS1 sends a request message containing Lth and U_confer to the base station BS2 in accordance with X2 application protocol (X2-AP) (step S303).

The base station BS2 that has received the request message determines whether or not the U_confer number of mobile stations is acceptable (step S304). The base station BS2 sends a response message representing the determination result to the base station BS1 in accordance with X2-AP (step S305). In a case that the mobile stations are acceptable and the determination result becomes "OK", the base station BS2 calculates L_confer (step S307) and increases the tilt angle of the antenna of the local station up to the angle corresponding to X+L_confer (step S308).

In a case that the response message is "OK", the base station BS1 that has received the response message reduces the tilt angle of the antenna of the local station down to the angle corresponding to Lth (step S306).

The mobile stations MS measure the reception level of a notification signal that is sent from the base station BS1 and report the measurement result to the base station BS1 (step S309).

As a result of the reduction in the tilt angle of the antenna of the base station BS1, the reception level of the notification signal from the base station BS1 decreases in the mobile stations MS that turn out to be present outside the sector of the base station BS1. With that, the base station BS1 decides the mobile stations MS having the notification signal at less than a threshold of the reception level as mobile stations subjected to handover (step S310). Then, the base station BS1 sends a handover request containing the identifiers of the mobile stations subjected to handover to the base station BS2 in accordance with X2-AP (step S311).

In the base station BS2, the mobile stations subjected to handover are handed over to the local station in accordance with the handover request. By performing the handover, the number of mobile stations contained in the base station BS1 becomes Uth or less.

Second Embodiment

The second embodiment relates to antenna tilt angle control in a case that three base stations have each of their cells overlap with each other.

Figure 12:
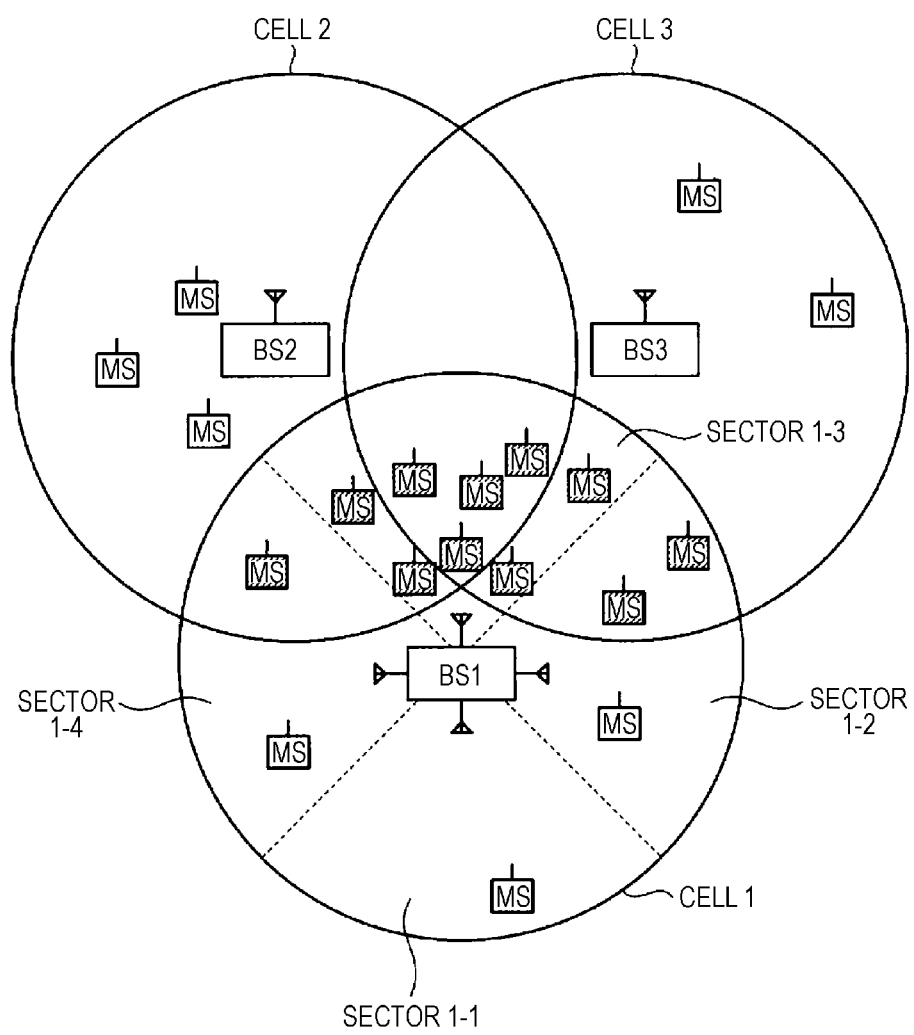
FIG. 12 is a diagram served for description of tilt angle control of a second embodiment.
Figure 13:
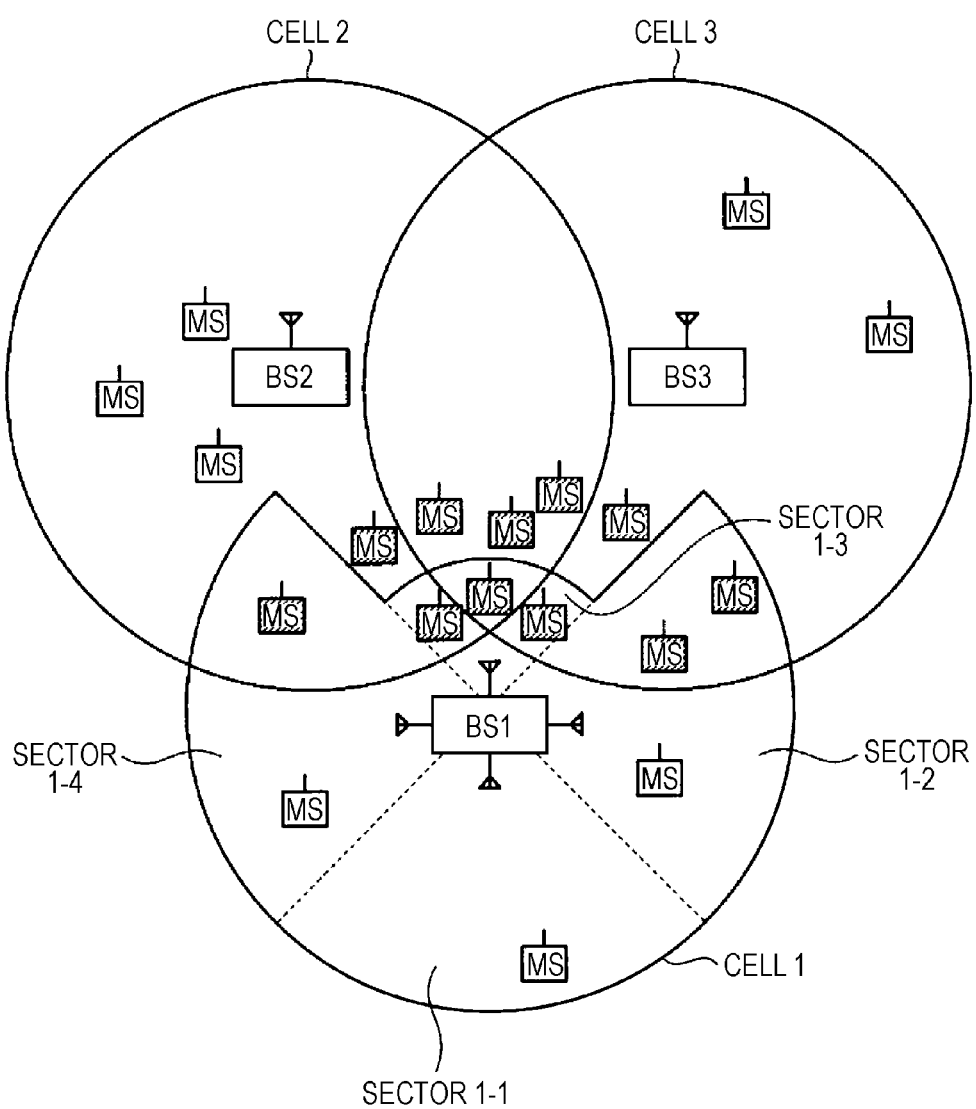
FIG. 13 is another diagram served for description of the tilt angle control of the second embodiment.

FIGS. 12 and 13 are diagrams served for description of the tilt angle control of the second embodiment. As illustrated in FIG. 12, the base station BS1 forms sectors 1-1 through 1-4. In addition, the sectors 1-1 through 1-4 form a cell 1. The base station BS2 forms a cell 2, and the base station BS3 forms a cell 3.

In FIG. 12, as determining that the number of mobile stations present in the sector 1-3 exceeds Uth per sector, the base station BS1 calculates Lth and U_confer in the sector 1-3. The base station BS1 sends a request message containing Lth and U_confer to the base stations BS2 and BS3.

The base stations BS2 and BS3 that have received the request messages respectively determine whether or not the U_confer number of mobile stations is acceptable. Then, the base stations BS2 and BS3 respectively send response messages representing the determination results to the base station BS1.

In a case that the U_confer number of mobile stations is acceptable, the base station BS2 sends a response message of "OK" to the base station BS1. In addition, in a case that the U_confer number of mobile stations is acceptable, the base station BS2 obtains an increment, L_confer_2, of the cell radius of the local station by the following expression (4) from Lth, the current cell radius, X2, of the local station, and the distance, W2, between the local station and the base station BS1. In contrast, in a case that the U_confer number of mobile stations is not acceptable, the base station BS2 sends a response message of "NG" to the base station BS1.

$$L\_confer\_2 = W2 - Lth - X2 \quad (4)$$

Similarly, in a case that the U_confer number of mobile stations is acceptable, the base station BS3 sends a response message of "OK" to the base station BS1. In addition, in a case that the U_confer number of mobile stations is acceptable, the base station BS3 obtains an increment, L_confer_3, of the cell radius of the local station by the following expression (5) from Lth, the current cell radius, X3, of the local station, and the distance, W3, between the local station and the base station BS1. In contrast, in a case that the U_confer number of mobile stations is not acceptable, the base station BS3 sends a response message of "NG" to the base station BS1.

$$L\_confer\_3 = W3 - Lth - X3 \quad (5)$$

In a case that the both the response message sent from the base station BS2 and the response message sent from the base station BS3 are "OK", the base station BS1 reduces the tilt angle of the antenna corresponding to the sector 1-3 down to the angle corresponding to Lth. In contrast, in a case that either one of the response message sent from the base station BS2 or the response message sent from the base station BS3 is "NG", the base station BS1 does not change the tilt angle of the antenna corresponding to the sector 1-3.

Here, a case that the response messages of both base stations BS2 and BS3 are "OK" and also "L_confer_2≤0" and "L_confer_3≤0" is assumed. Therefore, even in a case that both response messages are "OK", the tilt angle of the antenna is not changed in both base stations BS2 and BS3. In the meanwhile, since both response messages are "OK", the tilt angle of the antenna corresponding to the sector 1-3 of the base station BS1 is reduced down to the angle corresponding to Lth. Thus, the condition in the communication area after the antenna tilt angle control becomes, for example, as illustrated in FIG. 13.

As just described, according to the first and second embodiments, the base station 10 has the antenna 11 corresponding to the sectors of the local station, the antenna 11 capable of controlling the tilt angle that defines the size of the sectors. The TA command sending unit 14 sends a TA command for adjustment of timing of sending a signal that is sent from the mobile stations. The mobile station number monitoring unit 15 monitors the number of mobile stations present in the sector of the local station using TA commands. When the number of mobile stations present in the sector of the local station exceeds a containable upper limit, the tilt angle control unit 16 reduces the tilt angle of the antenna 11. Since this enables to promote handover of the mobile stations that are not possible to be contained in the sectors of the local station to the adjacent base station, it is possible to equalize the numbers of mobile stations being contained among the plurality of base stations.

The mobile station number monitoring unit 15 monitors the number of mobile stations for each distance from the local station at a plurality of stages in the sectors of the local station. The tilt angle control unit 16 reduces the tilt angle of the antenna 11 down to the angle corresponding to the distance to have not more than a containable upper limit of the number of mobile stations contained in the sectors of the local station among the distances at a plurality of stages. Since this enables for the base station 10 to contain the number of mobile stations up to the containable upper limit, it becomes possible to suppress the number of mobile stations subjected to handover to a minimum and is possible to suppress an increase in processing load related to handover.

The tilt angle control unit 16 reduces the tilt angle of the antenna 11 when the mobile stations that turn out to be present outside the sectors of the local station with the reduction of the tilt angle of the antenna 11 are allowed to be contained in the sectors of the adjacent base station. This enables the mobile stations that turn out to be present outside the sectors of the base station 10 to be securely handed over to the adjacent base station. Thus, it is possible to avoid loss of communication of the mobile stations that turn out to be present outside the sectors of the base station 10 with the reduction of the tilt angle of the antenna 11.

The tilt angle control unit 16 requests an adjacent base station to accept the mobile stations that turn out to be present outside the sectors of the local station with the reduction of the tilt angle of the antenna 11, and when there is a response representing that the mobile stations to be accepted are acceptable in the adjacent base station from the adjacent base station, the tilt angle of the antenna 11 is reduced. This enables the base station 10 to securely recognize that the mobile stations that turn out to be present outside the sectors of the local station are acceptable by the adjacent base station.

Other Embodiments

Figure 14:
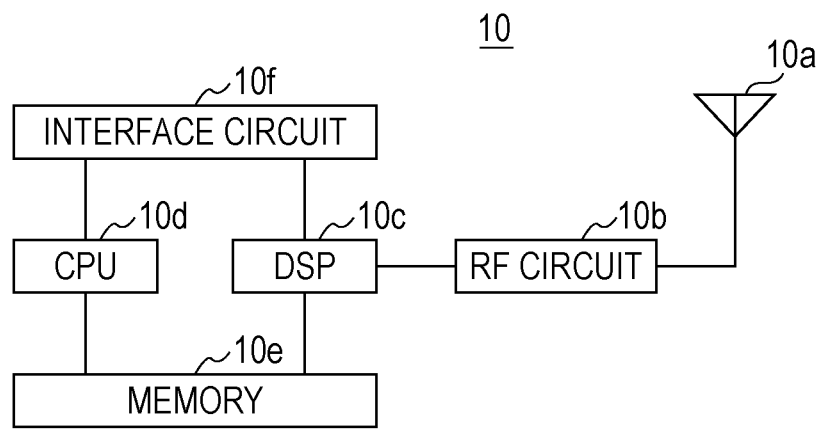
FIG. 14 is a diagram illustrating a hardware configuration example of the base station.

[1] The base station 10 of the first embodiment is possible to be realized by the following hardware configuration. FIG. 14 is a diagram illustrating a hardware configuration example of the base station. As illustrated in FIG. 14, the base station 10 has an antenna 10*a* capable of controlling the tilt angle, a radio frequency (RF) circuit 10*b*, a digital signal processor (DSP) 10*c*, a central processing unit (CPU) 10*d*, a memory 10*e*, and an interface circuit 10*f* as hardware components. As one example of the memory 10*e*, there are a RAM, such as SDRAM, a ROM, a flash memory, and the like. The antenna 11 is realized by the antenna 10*a*. The RACH receiving unit 12 and the TA command sending unit 14 are realized by the RF circuit 10*b* and DSP 10*c*. The TA command generation unit 13 is realized by the CPU 10*d*. The mobile station number monitoring unit 15 and the tilt angle control unit 16 are realized by the CPU 10*d* and the memory 10*e*. The wired communication unit 17 is realized by the interface circuit 10*f*.

[2] Various types of process in the above description may also be achieved by executing programs prepared in advance by a CPU. For example, programs corresponding to each process executed by the TA command generation unit 13, the mobile station number monitoring unit 15, and the tilt angle control unit 16 are memorized in the memory in advance and each program may also be read out to the CPU to be functioned as a process. Each program does not have to be memorized in the memory in advance. That is, each program may also be recorded in advance in a portable recording medium, such as a flexible disk (FD), a CD-ROM, an MO disk, a DVD disk, a magneto optical disk, an IC card, and a memory card connectable to the base station 10, for example, to have each program to be read out to the CPU and functioned as a process. In addition, for example, each program may also be memorized in advance in a computer or a server that is connected to the base station 10 in wireless or wired manner via the internet, a LAN, a WAN, and the like to have each program to be read out to the CPU functioned as a process.

[3] The "communication area" above is not limited to the "sector" and may also be a "cell". In addition, the specific name for the "communication area" above is not limited to a "cell" and a "sector".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
an antenna configured to be operated corresponding to a communication area of the base station, the antenna being capable of controlling a tilt angle, the tilt angle being an angle between a vertical direction and a direction of a main beam of the antenna;
a receiver configured to receive a signal from one or more mobile stations, wherein the signal includes a mobile station identifier;
a processor circuit configured to generate and output one or more Timing Advance (TA) commands to a transmitter and a monitoring unit, wherein each of the one or more TA commands is based on the signal received from the one or more mobile stations, and wherein each of the one or more the TA commands includes the mobile station identifier for each respective one or more mobile stations;
the transmitter is configured to transmit the one or more TA commands to the one or mobile stations, wherein the one or more TA commands correspond to adjustment of timing of sending a signal from one or more mobile stations to the base station;
the monitoring unit is configured to monitor a number of the one or more mobile stations present in the communication area and a distance of each of the one or more mobile stations from the base station, wherein the distance of each of the one or more mobile stations from the base stations corresponds with a value of the one or more TA commands; and
a controlling unit configured to reduce the tilt angle based on the value of the one or more TA commands when the number of the one or more mobile stations exceeds an upper limit allowed to be contained in the communication area.

2. The base station according to claim 1, wherein
the monitoring unit monitors the number of the one or more mobile stations for each distance at a plurality of stages from the base station in the communication area, and
the controlling unit reduces the tilt angle down to an angle that becomes the upper limit or less among the distances at the plurality of stages, the angle corresponding to a distance that causes the number of the one or more mobile stations contained in the communication area not to exceed the upper limit allowed to be contained in the communication area.

3. The base station according to claim 1, wherein
the controlling unit reduces the tilt angle when an individual mobile station that turns out to be present outside the communication area with reduction of the tilt angle is allowed to be contained in a communication area of another base station that is adjacent to the base station.

4. The base station according to claim 3, wherein
the controlling unit requests the other base station to accept the individual mobile station that turns out to be present outside the communication area with reduction of the tilt angle and
reduces the tilt angle when there is a response, representing that the individual mobile station to be accepted is acceptable in the other base station, from the other base station.

5. A base station comprising:
an antenna configured to be operated corresponding to a communication area of the base station, the antenna being capable of controlling a tilt angle, the tilt angle being an angle between a vertical direction and a direction of a main beam of the antenna;
receiving a signal from one or more mobile stations, wherein the signal includes a mobile station identifier;
generating one or more Timing Advance (TA) commands wherein each TA command is based on the signal received from the one or more mobile stations, and wherein the TA command includes the mobile station identifier for each or the one or more mobile stations;
transmitting the one or more TA commands to the one or more mobile stations, wherein the one or more TA commands correspond to adjustment of timing of sending a signal from the one or more mobile stations to the base station;
monitoring a number of the one or more mobile stations present in the communication area and a distance of each of the one or more mobile stations from the base station, wherein the distance of each of the one or more mobile stations from the base stations corresponds with a value of the one or more TA commands; and
reducing the tilt angle based on the value of the one or more TA commands when the number of the one or more mobile stations exceeds an upper limit allowed to be contained in the communication area.

* * * * *